United States Patent [19]

Luong

[11] Patent Number: 4,560,399
[45] Date of Patent: Dec. 24, 1985

[54] METHOD FOR MAKING GLASS OR CERAMIC ARTICLE

[75] Inventor: John C. Luong, Corning, N.Y.

[73] Assignee: Corning Glass Works, Corning, N.Y.

[21] Appl. No.: 663,160

[22] Filed: Oct. 22, 1984

[51] Int. Cl.$^4$ .............................................. C03B 19/06
[52] U.S. Cl. ......................................... 65/18.1; 65/17; 501/12
[58] Field of Search ......................... 65/17, 18.1, 134; 501/12; 264/56; 106/74

[56] References Cited

U.S. PATENT DOCUMENTS

| 4,419,115 | 12/1983 | Johnson | 65/18.1 X |
| 4,426,216 | 1/1984 | Satoh | 65/18.1 |

FOREIGN PATENT DOCUMENTS

| 84438 | 7/1983 | European Pat. Off. | 65/18.1 |
| 55-167143 | 12/1980 | Japan | 65/18.1 |

Primary Examiner—Kenneth M. Schor
Attorney, Agent, or Firm—K. van der Sterre

[57] ABSTRACT

Powdered oxides to be processed into glass or ceramic products by suspension in organic vehicles, followed by gelling and drying the suspensions and sintering the oxides to unitary products, are pretreated prior to incorporation in the suspension with a ketal drying agent. The pretreatment removes adsorbed water and surface hydroxyl groups from the articles, improving their dispersion properties and the properties of the resulting suspensions.

11 Claims, 3 Drawing Figures

METHOD FOR MAKING GLASS OR CERAMIC ARTICLE

BACKGROUND OF THE INVENTION

Field of the Invention

The present invention relates to a method for making a glass or ceramic article, and more particularly to a method for making such an article by casting from a gellable suspension of oxide particles.

The concept of preparing ceramic or glass articles from suspensions of oxide particles is familiarly applied in the field of slip casting. In that application, slips or slurries of oxide particles, typically greater than one micron in size, are cast, dried and fired to form amorphous glass or crystalline ceramic products. It is difficult, however, to prepare void-free and defect-free products by slip casting due to the relatively large size of the oxide particles employed.

Pure oxide particles can be produced by synthetic processes such the vapor phase oxidation of volatile metallic or metalloid compounds, and articles fabricated from such poure oxides can have unique physical properties. U.S. Pat. No. 2,272,342 to Hyde describes the manufacture of pure fused silica products from $SiCl_4$ by this process, and similar processes are presently used to produce the pure, highly transparent glasses used to fabricate low-loss optical waveguides for telecommunications applications.

Present techniques for shaping products from oxide particles typically involve the direct deposition of the particles from the vapor phase onto a sinterable substrate, followed by sintering to a unitary mass. This technique limits the configuration of the product, and other means for configuring products from particulate oxides have been sought. However, pure oxide particles produced by vapor phase oxidation are of sub-micron size, typically 0.01–0.5 microns in diameter in unagglomerated form, and are accordingly quite fluffy and difficult to handle.

U.S. Pat. Nos. 4,200,445 and 4,042,361 to Bihuniak et al. illustrate one approach toward solving this problem. In that method, aqueous suspensions of the oxides, termed fumed oxides because of the vapor phase method used for their production, are prepared, cast, dried and sintered to form a densified granular feed material which can be milled and shaped by slip casting. Glass resulting from the process is typically not of optical quality.

Published European patent application EP No. 0084438 describes an improved shaping method wherein products of arbitrary shape can be produced by the casting of non-aqueous colloidal oxide suspensions. In accordance with that method, submicron-sized oxide particles, eg. fused silica particles, are first dispersed in a non-aqueous vehicle to form a stable fluid suspension, and the suspension is then formed, as by casting, into a product configuration and caused to gel in that configuration by the addition of a gelling agent. Thereafter, the gelled suspension is dried by removal of the vehicle, and sintered by heating to provide a unitary glass or ceramic product, eg., of fused silica, which can have the same configuration (except for drying and sintering shrinkage) as that of the original casting.

It has been customary, in the preparation of suspensions of submicron oxide particles in accordance with the aforementioned process, to subject the particulate oxides to a heat treatment prior to dispersion in the non-aqueous vehicle in order to remove surface hydroxyl groups and adsorbed water commonly present on the surfaces of the particles. Further, the treated oxides are generally stored and dispersed under anhydrous conditions to avoid recontamination with water. These measures are employed because residual hydroxyl groups or water molecules on the particles were found to cause high viscosity and uncontrolled flocculation or gelling of the suspended oxides in the vehicles, particularly when it was desired to prepare suspensions of relatively high solids content.

The need to heat treat the oxides to remove surface hydroxyl groups and water, to thereafter store the oxides in dry form, and to disperse the oxides under anhydrous conditions, is considered disadvantageous because of the added cost of the heat treatment and special storage and handling. Hence a process wherein these steps could be avoided could be of considerable practical benefit.

It is therefore a principal object of the present invention to provide a process for manufacturing glass and ceramic articles from submicron-sized oxide particles which avoids the inconvenience of special handling and the need for a high temperature drying treatment.

Other objects and advantages of the invention will become apparent from the following description.

SUMMARY OF THE INVENTION

The present invention comprises an improvement in the prior art method of making glass or ceramic products by the process of casting and gelling non-aqueous suspensions of oxides which are subsequently dried and sintered. In accordance with this improvement, the sub-micron sized oxide particles to be incorporated in the suspension are reacted, prior to dispersion, with a dehydrating agent consisting of a ketal compound.

The ketal compound has the structure:

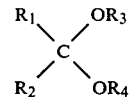

wherein $R_{1-4}$ are lower alkyl groups of from 1-14 carbon atoms. The alkyl groups may be the same or different; most commonly $R_3$ and $R_4$ are the same because of the way in which ketals are commercially prepared. These ketals can react readily with water present on the surfaces of the oxide. A general reaction can be written as follow:

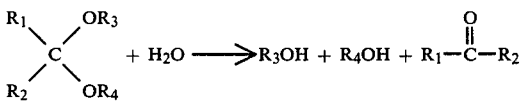

Ketals are also capable of reacting with surface hydroxyl groups present on the surfaces of the oxide particles, effectively removing such groups as potential sites for water adsorption. A proposed general reaction is as follows:

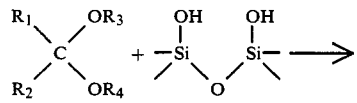

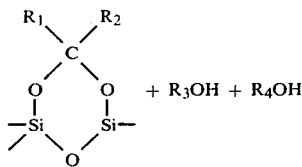

Using appropriate dispersants, particulate oxides which have been reacted with a ketal drying agent in accordance with the invention are generally easier to disperse in non-aqueus vehicles than either untreated oxides or oxides which have been thermally treated to remove adsorbed water and hydroxyl groups. Yet suspensions of ketal-treated oxides can be conveniently gelled, dried and sintered to provide high quality glass and ceramic products. Further, because relatively concentrated suspensions of treated oxides can more easily be prepared, drying of the gel is easier and the possibility of gel cracking is reduced. Thus high quality of products are easier to manufacture.

Treated oxides can also be subjected to surface esterification treatments. As described in a copending, commonly assigned patent application, Ser. No. 663,161, concurrently filed herewith, such estification treatments have been found to be useful to provide the dispersibility of particulate oxides in non-aqueous vehicles, and can render the oxides resistant to water adsorption and hydration under ambient conditions, relieving the need for dry storage. Oxides treated according to the present invention can also be estified, with the resulting hydrophobic oxides exhibiting very good stability against moisture recontamination under ambient storage conditions.

DESCRIPTION OF THE DRAWINGS

The invention may be further understood by reference to the drawings, wherein.

DETAILED DESCRIPTION

As is well known, the surface of silica and many other common inorganic oxide materials is hydrated under normal ambient conditions. This surface hydration typically consists of adsorbed molecular water and surface hydroxyl groups covalently bonded to the oxide surface.

Figure 1:
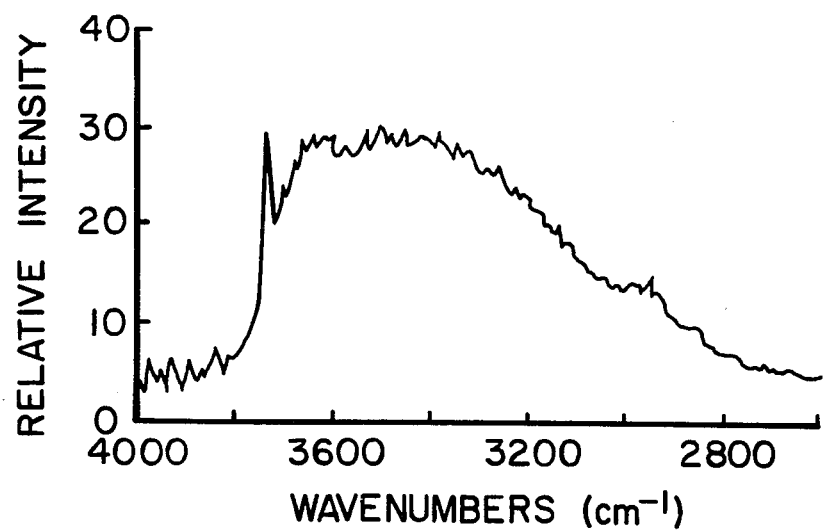
FIG. 1 consists of an infrared absorption spectrum of a sample of commercially available silica.

The presence of surface hydroxyl groups can be detected by infrared absorption analysis, as shown in FIG. 1 of the drawings, which is an infrared spectrum of a commercially available powdered silica material, Aerosil OX-50 silica, obtainable from Degussa, Inc. of Teterboro, N.J. That absorption spectrum, which was generated by photoacoustic Fourier transform (FT) infrared (IR) analysis techniques, shows a relatively narrow absorption peak at 3750 cm$^{-1}$ and a broad absorption peak at 3700–3200 cm$^{-1}$, both of which are due to the presence of hydroxyl groups and adsorbed water on the silica surface.

The presence of these surface hydroxyl groups, also called silanol (Si-OH) groups, makes it difficult to form stable dispersions of powdered oxides in a non-aqueous (organic) liquid such as chloroform, because mutual attraction between the hydrated particles causes coagulation of the oxide in the suspension.

Figure 2:
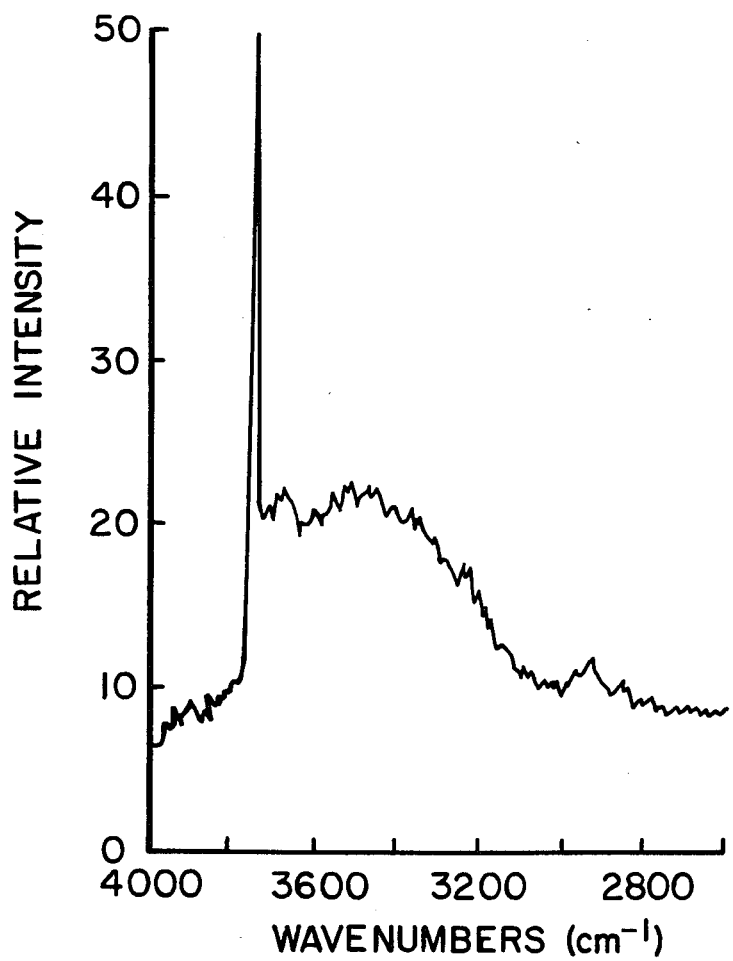
FIG. 2 consists of an infrared absorption spectrum of a sample of a silica material similar to that shown in FIG. 1 after a heat treatment at 800° C., and FIG. 3 consists of an infrared absorption spectrum of a sample of a commercially available silica material after treatment with a ketal drying agent.

Heat treatments can be effective to remove all but isolated hydroxyl groups from the surfaces of hydrated oxide particles such as silica. FIG. 2 of the drawing is an infrared absorption spectrum produced by photoacoustic FT-IR analysis of a sample of a silica powder such as analyzed in FIG. 1, after heat treatment at 800° C. for approximately 30 minutes to remove surface hydroxyl groups. The residual 3750 cm$^{-1}$ peak in FIG. 2 suggests the retention of some hydroxy groups, believed to be isolated groups, but the broad peak at 3700–3200 cm$^{-1}$ seen in FIG. 1 is greatly reduced.

The hydroxyl groups which are removed from silica by heat treatments such as described above have been characterized as vicinal silanol groups because they are thought to be in close proximity on the silica surface. The removal of vicinal silanol groups through heat treatment occurs as follows:

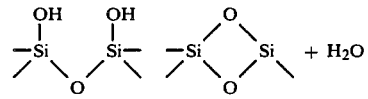

Heat-treated silica produced as described can be conveniently dispersed in non-aqueous vehicles, despite the presence of residual isolated hydroxyl groups, through the use of appropriate dispersants. This technique is described in the aforementioned published European patent application EP No. 0084438, and reference may be made thereto for a further description of the dispersion behavior of heat-treated oxides in organic vehicles.

In accordance with the present invention, hydroxyl removal from the surfaces of hydrated oxides is accomplished by means of a dehydrating agent consisting of a ketal compound. Ketals have been used as water scavengers in organic synthesis, the most common ketal being 2,2-dimethoxy propane, $(CH_3)_2C(OCH_3)_2$. This compound reacts with free water to produce methanol and acetone according to the following reaction.

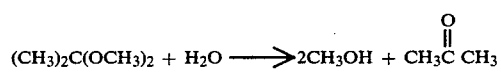

Figure 3:
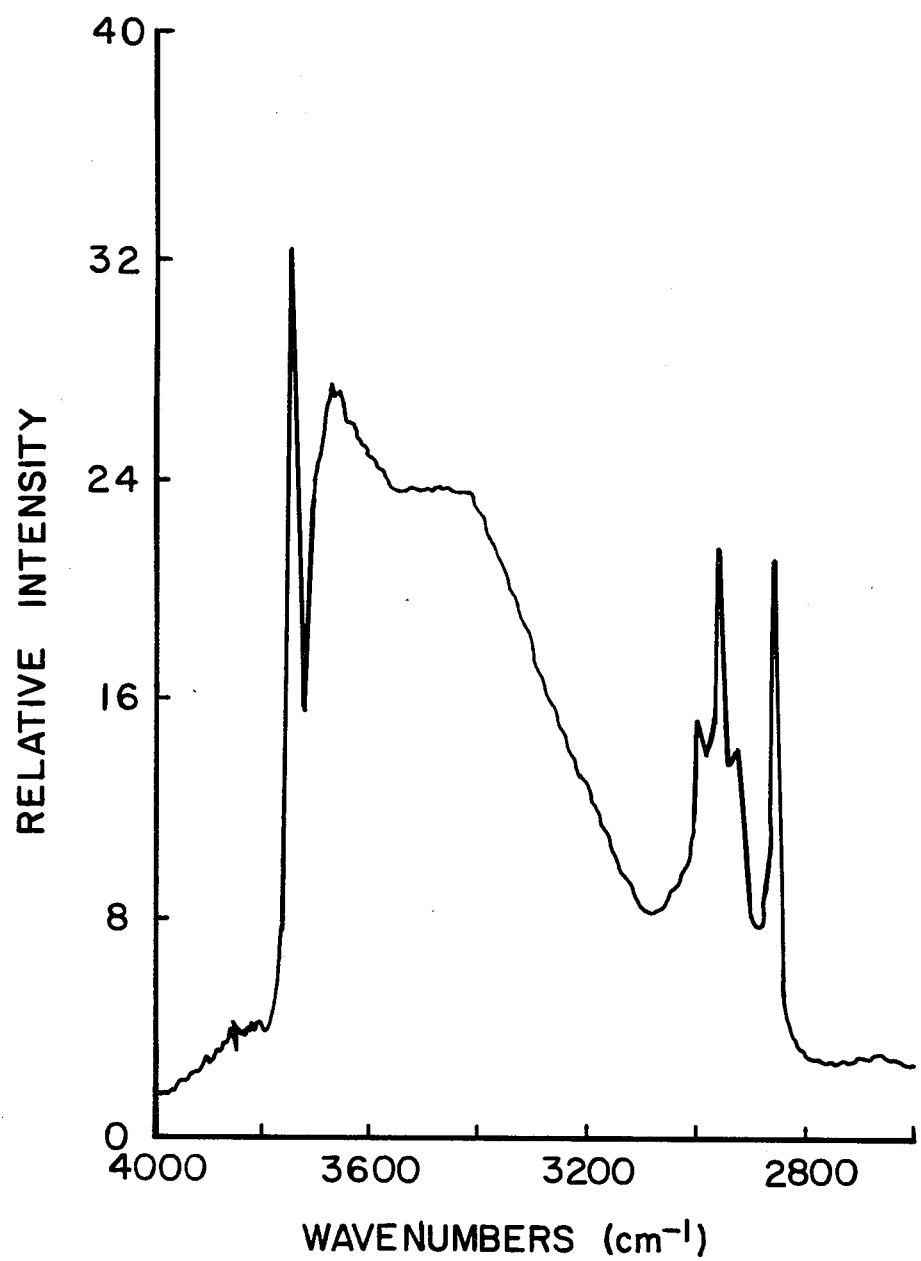

Contacting a hydrated oxide such as hydrated silica with a ketal such as 2,2-dimethoxyl propane is found to remove vicinal hydroxy groups from the oxide surface. FIG. 3 of the drawing consists of a photoaccoustic FT-IR spectrum of an OX-50 powdered silica material such as characterized in FIG. 1, after treatment with a 2,2-dimethoxy propane dehydrating agent. The reduction of the broad absorption peak at 3700–3200 cm$^{-1}$ indicates a significant reduction in vicinal hydroxl content. (The added absorption near 2900 cm$^{-1}$ is due to C—H stretch absorption by the surface-bound methyl groups). The postulated reaction for the removal of vincinal hydroxyl groups by 2,2-dimethoxy propane is as follows:

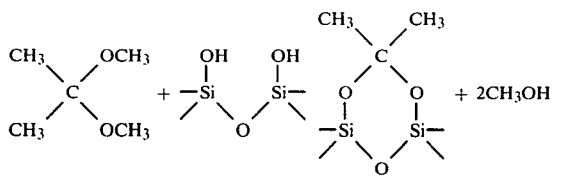

The dispersion behavior of a treated powered oxide material such as the treated silica characterized in FIG. 3 is similar to that of silica which has been heat-treated. The treated oxide can readily be dispersed in an organic vehicle using an added dispersant such as n-decanol, and the resulting dispersion is very stable. Further, the suspension can easily be gelled by the addition of a basic gelling agent such as ammonia or a basic amine.

Oxides which are treatable with ketal drying agents are considered to include any of the oxides which are prone to water adsorption or hydroxylation under ambient storage conditions. Such oxides include $SiO_2$, $Al_2O_3$, $GeO_2$, $P_2O_5$, MgO, $TiO_2$, $ZrO_2$, and the like. The oxides $SiO_2$, $Al_2O_3$, $GeO_2$ and $TiO_2$ are particularly important in suspension casting processes.

Any relatively volatile ketal compound of the formula $(R)_2C(OR)_2$ is considered to be a useful dehydrating agent in accordance with the invention, R being selected from the group consisting of lower alkyl group of from 1-4 carbon atoms. The R substituents may be the same or different. The preferred ketal is 2,2-dimethoxy propane, wherein R in each occurrence is a methyl group. Examples of other compounds which could be used are 2,2-dimethoxy butane, 2,2-diethoxy propane, and 2,2-diethoxy butane.

Treatment of a hydrated oxide material with a selected ketal typically comprises contacting the oxide with the ketal at a temperature sufficient to react the ketal with surface hydroxyl groups present on the surfaces of the oxide particles. The preferred treatment is a vapor treatment wherein the oxide is contacted with ketal vapors, e.g., by passing those vapors over the oxide material at reaction temperatures above the condensation temperature of the ketal, and sufficient to promote the desired dehydration reaction.

The following example illustrates the use of the invention in the fabrication of a silica glass article.

Example I

A 30 gram sample of a particulate silica material, commercially available as OX-50 silica from Degussa, Inc. of Teterboro, NJ, is selected for treatment. This silica has an average particle size of approximately 0.45 microns, and when examined by photoacoustic FT-IR analysis produces an absorption spectrum substantially as shown in FIG. 1 of the drawing.

The silica sample in placed in a horizontal tube furnace of 5 cm. diameter and the furnace and sample are heated to about 200° C. Argon at a slow flow rate is then passed into the tube and, after the tube purging, vapors of 2,2-dimethoxy propane from a bubbler maintained at 65° C. are entrained in the argon stream and carried into the furnace and over the silica sample. The 2,2-dimethoxy propane is delivered in the argon stream at a rate of about 6 g/min.

This treatment is continued for about 30 minutes, after which ketal flow is terminated and the sample allowed to cool under argon to room temperature. A sample of this treated silica is then subjected to photoacoustic FT-IR analysis. The resulting absorption spectrum is substantially as shown in FIG. 3 of the drawing.

To provide a non-aqueous silica suspension using the treated material, a 20 g sample of treated silica is added to 33 ml of a chloroform vehicle consisting of 91% $CHCl_3$ and 9% of an n-decanol dispersant by volume. The silica sample disperses easily and quickly in the vehicle to provide a suspension containing about 22 volume percent $SiO_2$, having a viscosity in the range of about 35-55 cps.

The viscosity of this suspension compares favorably with the viscosity of similar suspensions of thermally treated silica. A typical suspension of thermally treated OX-50 silica at a solids content of about 20 volume percent in chloroform (with 10 volume percent of an n-decanol dispersant), has a viscosity in the range of about 50-70 cps.

The suspension produced as described can be rapidly gelled by the addition of an amine gelling agent such as ammonia to produce a high-solids-content gel. This gel can be dried relatively rapidly to a unitary preform, due to the high solids content, and can be sintered to produce clear glass of very high optical quality. A suitable procedure for producing a glass product from such a suspension is as follows. To 50 ml of a $SiO_2$-chloroform suspension prepared as described above is added a small amount of 1,3-diamino propane gelling agent. The mixture is shaken to obtain mixing of the gelling agent and then cast into a mold cavity 5 cm×5 cm in size to a depth of about 1 cm, the mold cavity being loosely lined with a flexible polyethylene film. Gelation of the suspension occurs within a few minutes, and the resulting gel is permitted to dry slowly under a vented cover over an interval of 72 hours.

The dried casting is next heated to 800° C. to remove residual organics and then sintered to a clear glass article at 1400° C. within about 30 minutes. The quality of a glass article produced by this procedure would be equivalent to that produced using thermally treated $SiO_2$.

For this and the other suspensions described herein the optimum gelling agent and the optimum drying rate and sintering conditions for treating the gel may readily be determined by routine experiment within the scope of the aforementioned published European patent application, EP No. 0084438, and reference may be made thereto for a further description of the known procedures for gelling, drying, and sintering colloidal oxide suspensions to provide glass and ceramic products.

It is also possible to combine the ketal dehydration process with a surface esterification process to produce a treated oxide which is both hydrophobic and directly dispersible in a non-aqueous vehicle such as chloroform without the addition of a further dispersant.

The surface esterification of an oxide having bound surface hydroxyl groups involves treating the oxide with an alcohol at an elevated temperature to react the alcohol with surface hydroxyl groups. The product is an oxide wherein at least some of the surface hydroxyl groups are replaced by alkoxy groups. The following reaction has been proposed:

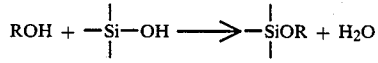

The alcohol used is typically a lower aliphatic alcohol of from 3–20 carbon atoms. The estified oxide product, depending on the degree of esterification (i.e., on how dense a population of alkoxy groups has been produced on the oxide surface), tends to be hydrophobic and organophilic. Typically, esterification treatments providing a high degree of esterification involve suspending the oxides in liquid alcohols or alcohol-oxide slurries, and therefore require subsequent separation of the oxide from the alcohol by additional process steps before a useful oxide product can be obtained. Treatment of the oxide with vaporized alcohols has previously provided only a slightly esterified product.

In accordance with the present invention, esterification of the oxide by an alcohol is vapor form is found to occur readily in the presence of a vaporized ketal drying agent. The treated product is not only free of absorbed water and strong water adsorption sites, but is also hydrophobic and readily dispersible in organic solvents. Further, the treated product is found to excellent stability against rehydration and/or rehydroxylation in the presence of atmospheric moisture. Thus, after treatment, the treated material can be stored for relatively long periods without special protection from the atmosphere.

The following example illustrates a procedure for carrying out esterification concurrently with ketal drying, using a vapor mixture comprising ketal and alcohol vapors.

Example 2

A 20 gram sample of a particulate silicon dioxide, commercially available as OX-50 silica from Degussa, Inc., Teterboro, NJ, is prepared for treatment. This silica sample is positioned in a tube furnace and heated to a temperature of about 250° C.

A bubbler containing 500 ml. of n-decanol and 50 ml. of 2,2-dimethoxy propane is heated to a temperature of 200° C. and a stream of argon carrier gas is passed through the bubbler at a slow flow rate and into the tube furnce containing the heated silica. The mixed vapors of n-decanol and 2,2-dimethoxy propane are passed over the silica sample for approximately 5 hours after whih the flow of mixed vapors through the furnace is terminated and the silica sample is allowed to cool in the argon stream to room temperature.

The silica product produced by this process is hydrophobic and can be directly dispersed in an organic vehicle such as chloroform to give a fluid suspension at solids contents up to about 20 volume percent. Silica suspensions prepared using silica treated in accordance with this example can be gelled by the addition of a conventional gelling agent such as ammonia gas to give a firm gel which can be dried and sintered to provide a unitary transparent glass of excellent optical quality.

The preparation of a fluid suspension containing a crystalline oxide such as $Al_2O_3$ is illustrated by the following example.

Example 3

A 20 gram sample of pure particulate $Al_2O_3$, commercially available as Aluminium Oxide C from Degussa, Inc. of Teterboro, NJ, is selected for treatment. Thus alumina sample is positioned in a tube furnace as in Example 1, and heated to a temperature of 200° C.

A bubbler containing 200 ml of 2,2-dimethoxy propane is heated to a temperature of approximately 65° C. and a stream of argon carrier gas is passed through the bubbler and over the $Al_2O_3$ sample at a slow flow rate, delivery of the 2,2-dimethoxy propane through the tube furnace being at a rate of about 3 grams per minute. This treatment is continaued for about 3 hours, after which the flow of ketal vapors is interrupted and the sample is cooled under flowing argon to room temperature.

To prepare a suspension of the treated alumina thus provided, 6 grams of treated alumina is added to a flask containing 2 ml of methanol and 1 ml of octane as a vehicle, with 1 ml of n-decanol as a dispersant, and the flask is shaken. The resulting colloid, although yellow in color (attributed to some ketal decomposition by the alumina), is quite fluid. Gelation of such suspensions can be achieved using one of the known gelling agents, such as ammonia gas.

While a vapor phase ketal treatment is normally to be preferred for dehydrating and dehydroxylating oxide materials according to the invention, liquid treatments may be favored for some applications and can also be used. The reaction conditions employed will depend on the characteristics of the oxide and the ketal drying agent selected for treatment, and can readily be determined by routine experiment.

Of course the foregoing examples are merely illustrative of procedures which could be employed in carrying out the invention; numerous variations and modifications of those procedures and other practices described herein may be carried out within the scope of the appended claims.

I claim:

1. In the method for making a glass or ceramic article which comprises the steps of dispersing submicron-sized oxide particles in a non-aqueous vehicle to provide an oxide suspension, forming the suspension into a shaped configuration for the article and causing it to gel in that shaped configuration by the addition of a gelling agent, drying the gelled shape to remove the vehicle therefrom, and sintering the dried shape to provide a unitary glass or ceramic article, the improvement wherein:

the submicron-sized oxide particles are treated prior to dispersion in the non-aqueous vehicle with a dehydrating agent consisting of a ketal compound, that compound being of the structure

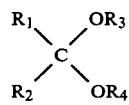

wherein $R_1$–$R_4$ are alkyl groups of from 1–4 carbon atoms.

2. A method is accordance with claim 1 wherein the submicron-sized oxide particles are produced by a vapor phase oxidation process.

3. A method in accordance with claim 1 wherein the oxide is selected from the group consisting of $SiO_2$, $Al_2O_3$, $GeO_2$, $P_2O_5$, $MgO$, $TiO_2$ and $ZrO_2$.

4. A method in accordance with claim 2 wherein the oxide is selected from the group consisting of $SiO_2$, $Al_2O_3$, and $TiO_2$.

5. A method in accordance with claim 4 wherein $R_3$ and $R_4$ are methyl groups.

6. A method in accordance with claim 4 wherein the ketal is 2,2-dimethoxy propane.

7. A method in accordance with claim 6 wherein, for the treatment with a ketal compound the oxide is treated with ketal vapors.

8. A method in accordance with claim 1 wherein, for the treatment with a ketal compound the oxide is treated with a vapor mixture which includes ketal vapors.

9. A method in accordance with claim 8 wherein the treated oxide is hydrophobic.

10. A method in accordance with claim 9 wherein the oxide is selected from the group consisting of $SiO_2$, $Al_2O_3$, $GeO_2$, $P_2O_5$, $MgO$, $TiO_2$ and $ZrO_2$.

11. A method in accordance with claim 10 wherein the ketal is 2,2-dimethoxypropane and the oxide is $SiO_2$, $Al_2O_3$ and $TiO_2$.

* * * * *

UNITED STATES PATENT AND TRADEMARK OFFICE
CERTIFICATE OF CORRECTION

PATENT NO. : 4,560,399
DATED : December 24, 1985
INVENTOR(S) : John C. Luong

It is certified that error appears in the above-identified patent and that said Letters Patent is hereby corrected as shown below:

Column 1, line 23, delete "poure" and insert -- pure --.

Column 3, line 27, delete "estification" and insert
  -- esterification --.

Column 3, line 33, delete "estified" and insert -- esterified --.

Column 4, line 55, delete "2,2-dimethoxyl" and insert
  -- 2,2-dimethoxy --.

Column 7, line 2, delete "estified" and insert -- esterified --.

Column 7, line 15, delete "is" and insert -- in --.

Column 7, lines 17-18, delete "absorbed" and insert -- adsorbed --

Column 7, line 44, delete "whih" and insert -- which --.

Column 7, line 64, delete "Thus" and insert -- This --.

Signed and Sealed this

Twentieth Day of May 1986

[SEAL]

Attest:

DONALD J. QUIGG

Attesting Officer

Commissioner of Patents and Trademarks